United States Patent [19]
Reid et al.

[11] Patent Number: 5,591,332
[45] Date of Patent: Jan. 7, 1997

[54] FILTER ASSEMBLY WITH AUTOMATIC SHUT-OFF AND QUICK-CONNECT FILTER CARTRIDGE

[75] Inventors: Roger P. Reid; Lance J. Christiansen, both of Caldwell, Id.

[73] Assignee: Omnipure Filter Co., Caldwell, Id.

[21] Appl. No.: 450,229

[22] Filed: May 25, 1995

[51] Int. Cl.[6] .......................... B01D 35/153; B01D 27/10
[52] U.S. Cl. ..................... 210/235; 210/282; 251/149.4; 251/149.6
[58] Field of Search ..................... 210/234, 235, 210/238, 282; 251/98, 99, 114, 115, 116, 128, 284, 291, 325, 149.4, 149.6

[56] References Cited

U.S. PATENT DOCUMENTS

| | | | |
|---|---|---|---|
| 2,431,782 | 12/1947 | Walton et al. | 210/183 |
| 2,894,630 | 7/1959 | Humbert, Jr. | 210/133 |
| 2,932,400 | 4/1960 | Scavuzzo | 210/235 |
| 2,945,591 | 7/1960 | Pall . | |
| 3,040,894 | 6/1962 | Pall | 210/90 |
| 3,283,907 | 11/1966 | Whiting | 210/234 |
| 3,317,046 | 5/1967 | Raupp . | |
| 3,319,791 | 5/1967 | Horne | 210/234 |
| 3,715,032 | 2/1973 | Nicko | 210/133 |
| 3,746,171 | 7/1973 | Thomsen | 210/234 |
| 4,077,876 | 3/1978 | Southall | 210/136 |
| 4,082,673 | 4/1978 | Cilento | 210/234 |
| 4,199,443 | 4/1980 | Tauber . | |
| 4,222,875 | 9/1980 | Sikula, Jr. | 210/235 |
| 4,396,512 | 8/1983 | Beauman et al. . | |
| 4,645,601 | 2/1987 | Regunathan et al. | 210/433.2 |
| 4,654,142 | 3/1987 | Thomsen et al. | 210/232 |
| 4,725,354 | 2/1988 | Thomsen et al. | 210/232 |
| 4,735,716 | 4/1988 | Petrucci et al. | 210/232 |
| 4,818,397 | 4/1989 | Joy | 210/232 |
| 4,857,189 | 8/1989 | Thomsen et al. | 210/232 |
| 4,877,521 | 10/1989 | Petrucci et al. | 210/171 |
| 4,915,831 | 4/1990 | Taylor | 210/232 |
| 4,948,505 | 8/1990 | Petrucci et al. | 210/238 |
| 4,956,086 | 9/1990 | Thomsen et al. | 210/232 |
| 5,092,999 | 3/1992 | Valenzuela et al. | 210/321.72 |
| 5,108,598 | 4/1992 | Posner | 210/232 |
| 5,336,406 | 8/1994 | Stanford et al. | 210/235 |

*Primary Examiner*—Thomas M. Lithgow
*Attorney, Agent, or Firm*—Ken J. Pedersen; Barb S. Pedersen

[57] ABSTRACT

Embodiments of a fluid filtering assembly are shown and described, each embodiment including a valve head that routes fluid to and from a filter cartridge and that includes a valve system that automatically opens and closes when the filter cartridge is inserted and removed, respectively. The valve system preferably includes a generally-cylindrical piston with a hollow interior space, which receives a stem member. The stem member has a bottom-end seat or sealing member and has a central body shape that allows fluid to flow up through the piston interior space, either through or up around the stem member. Upon removal of the filter cartridge, the piston is biased to move down into an "off" position, to close both the inlet and outlet fluid passages. In this "off" position, the piston exterior surface blocks off radial fluid inlets and the piston interior surface seals with the stem bottom end seat to prevent fluid backflow out of the piston interior space. The filter cartridge preferably includes a neck with a centrally-located, vertical fluid outlet hole surrounded by a ring of vertical fluid inlet holes near the outer perimeter edge of the neck.

4 Claims, 6 Drawing Sheets

FILTER ASSEMBLY WITH AUTOMATIC SHUT-OFF AND QUICK-CONNECT FILTER CARTRIDGE

BACKGROUND OF THE INVENTION

1. Field of the Invention

This invention relates generally to in-line fluid filter assemblies. More specifically, this invention relates to filter assemblies with a filter valve head that includes a shut-off means for automatically stopping fluid flow when the filter cartridge is removed.

2. Related Art

This invention has applications in many areas of fluid filtering, for example, water and beverage filtering in restaurants, homes, or food processing plants. Filtering may be required for removing bad tastes, odors, particulate, minerals, or even microbes, for example, to provide a consistent, high-quality beverage or food product or to meet purity standards for other down-stream processes.

Many filter cartridge plus head systems, herein called "filter assemblies", have been designed for in-line filtering of fluids. The filter cartridge is typically connected to a head that includes passages for directing the fluid into the filter cartridge from an upstream fluid conduit, such as a pipe or tube, and for directing the fluid out of the filter and into a downstream conduit. The head is often designed to be permanently installed into the fluid conduit by threaded couplings. The filter cartridge may itself be disposable or may include a reusable casing that encloses a disposable filter or that may be reloaded.

Several examples of in-line filter heads with internal shut-off valve systems are found in U.S. patents. Such patents include Pall (U.S. Pat. No. 3,040,894), Whiting (U.S. Pat. No. 3,283,907), Nicko (U.S. Pat. No. 3,715,032), Tauber (U.S. Pat. No. 4,199,443), and Posner (U.S. Pat. No. 5,108,598).

Pall discloses a filter system for removing suspended foreign matter from fluids. Upon removal of the filter bowl, a spring-biased valve sleeve drops down to close off the fluid inlet and outlet chambers. A lower, outer rim of the valve sleeve engages a sealing surface and elements to close a vertical inlet passage. A seal on the inner surface of the upper, narrow portion of the valve sleeve seals against a valve seat and bushing. The valve seat and bushing depend from a hollow, cylindrical wall, which has an outer surface that guides the inner surface of the valve sleeve and an inner surface that defines a vertical, tubular fluid outlet chamber.

Whiting discloses a valve sleeve that is biased to move down when a filter is removed. The upper, horizontal rim of the valve sleeve seals against the horizontal top of an inwardly-extending protrusion to close off a vertical inlet passage. A lower, inside corner of the valve sleeve seals against a ledge or plate-shaped valve seat of a valve stop member. The valve stop member depends from a hollow, cylindrical wall, which has an outer surface that guides the inner surface of the valve sleeve and an inner surface that defines a vertical, tubular fluid outlet chamber.

Nicko discloses a spring-biased valve member that closes an outlet passage by pushing the valve member's bottom-end plug member against the top of a ring-shaped seat member mounted in the vertical, cylindrical outlet passage. To close off the inlet passage, an upper, cylindrical portion of the valve member seats against a cylindrical seat member formed in the vertical portion of the inlet passage.

Tauber discloses a spring-biased inner filter housing that drops down upon removal of the filter. The bottom edge of the inner filter housing seals against the bottom inside surface of the outer filter casing. The top flange of the inner filter housing seals against an inwardly-protruding rim to close off the outlet.

Posner discloses a filter cartridge with an inlet at one end of the filter cartridge and an outlet at the opposite end of the cartridge. Both the inlet and outlet ends are connected to fluid pipes via quick-connect couplers that include a 90° angle, so that the cartridge may be removed horizontally from the pipes.

Filter valve systems that include two separate closure or valve members are disclosed in Walton, et al., (U.S. Pat. No. 2,431,782), and Humbert, Jr. (U.S. Pat. No. 2,894,630), Scavuzzo (U.S. Pat. No. 2,932,400), Southhall (U.S. Pat. No. 4,077,876), and Sikula, Jr. (U.S. Pat. No. 4,222,875).

Prior filter assemblies are too complicated, expensive, or difficult to maintain for many filtering applications. This is the case for the vending machine industry, for example, where large numbers of vending machines in a wide variety of settings must be maintained and kept in optimum condition. These vending machines require clean, filtered fluid to remove bad tastes, odors, hard water particles, etc. The filters used in these machines have a finite life and therefore often need to be replaced. Requirements for replacing the typical vending machine filter include the use of tools, technical knowledge of the product, and shutting off at least one valve in the fluid supply line before removal of the filter and reopening the valve(s) after installation of the filter.

Therefore, what is still needed is a user-friendly filter assembly that may be easily installed and replaced without the requirements of specific technical knowledge, tools, and manual valve operation. What is still needed is an improved auto-shut-off filter valve head design that is reliable, leak-proof, and economical.

SUMMARY OF THE INVENTION

An object of the present invention is to provide an improved in-line filter assembly having a valve head with an automatic shut-off valve system. Another object of the invention is to simplify maintenance of the filter assembly, so that the cartridge may be easily and quickly removed and replaced without turning valves and using tools, and by someone not having detailed knowledge about the filtering flowscheme and apparatus. Another object is to provide an automatic shut-off system with negligible volume of residual liquid that might drip or flow out of the valve head when the cartridge is removed.

The present invention comprises a filter assembly having a valve head, herein also called a "valve head assembly", and a fluid filter cartridge. The valve head assembly is fixedly mounted in a fluid conduit, for support of the filter cartridge and for routing fluid to and from the filter cartridge through inlet and outlet passages that include an inlet port and an outlet port at the outer surface of the valve head assembly. The valve head assembly inner surface, which is formed by a piston sleeve, defines a centrally-located, vertically-aligned cylindrical bore for accepting and sealing the upper end of the said filter cartridge, so that the valve head inlet and outlet passages may be in fluid communication with the filter inlet and outlet openings. The filter cartridge cap is adapted to cooperate with the valve head, for starting and stopping fluid flow and for easy and secure attachment of the filter to the valve head.

The valve head assembly includes a valve or closure member, which automatically shuts-off and turns-on fluid flow and which is actuated by the removal and insertion of the filter cartridge, respectively. When the closure member is displaced to an open position by the filter cartridge being supported and sealed in the said valve head assembly, the inlet and outlet passages are opened or unblocked. When the closure member is biased to a closed position by the filter cartridge being unsupported and unsealed from said valve head assembly, the inlet and outlet passages are closed or blocked.

Preferably, the closure member is a single, generally cylindrical, hollow, open-ended, piston member with an interior space for receiving a stem member. When the piston is raised by the insertion of the filter cartridge, the piston slides up further into the cylindrical bore, guided on its exterior surface by the surface of the piston sleeve. As it slides up, the piston exposes radial openings in the piston sleeve, and, also, exposes a fluid exit hole or channel in the stem member. The radial openings allow fluid to flow from the inlet port, through the piston sleeve and into the cylindrical bore to reach the filter inlet. The exit hole or channel in the stem member allows filtered fluid to flow from the filter outlet and up through a space between the interior of the piston and the central body of the stem member, so that fluid may reach the outlet port.

When the filter cartridge is lowered, a biasing means pushes the piston downward and the piston vertical exterior surface seals against the piston sleeve vertical surface to block the radial openings. Also, the interior surface of the piston seals against the bottom end of the stem member, to block the space between the piston and stem member.

The preferred piston member, stem member, and biasing spring all touch each other and cooperate with each other, but are unattached to each other and unattached to the other elements of the valve head assembly. The piston member is supported inside the cylindrical bore of the valve head assembly, and the stem member is supported inside the piston member with its plate-shaped top abutting against the top surface of the cylindrical bore. The biasing spring extends between the piston and the stem and biases the piston and stem away from each other. Optionally, the stem member may be attached to the valve head but is not attached to the piston member.

The preferred filter cartridge has a cap with a centrally-located, upwardly-extending neck with vertical fluid inlet holes bored around the neck perimeter and a vertical fluid outlet hole bored in the center of the neck. An externally-threaded outer rim of the cap cooperates with the internal threads of the valve head to support the filter. A locking means is also provided between the valve head and filter cartridge.

DETAILED DESCRIPTION OF THE PREFERRED EMBODIMENT

Referring to the FIGS. 1–6, there are shown two, but not the only, embodiments of the invented filter assemblies 8 and 160, each including a valve head assembly and a cooperating filter cartridge.

Valve Head Assembly

The valve head assembly 10 comprises an outer valve head 12, a piston sleeve 14, a securing ring 16, a piston member 18, an elongated member called a "valve stem" or "stem" 20, a piston return spring 22, seven seals 31, 32, 33, 34, 35, 36, 37, an arm member called a "lever arm" 40, lever arm return spring 42, a mounting bracket 44, and screws or other attachment means.

Figure 1:
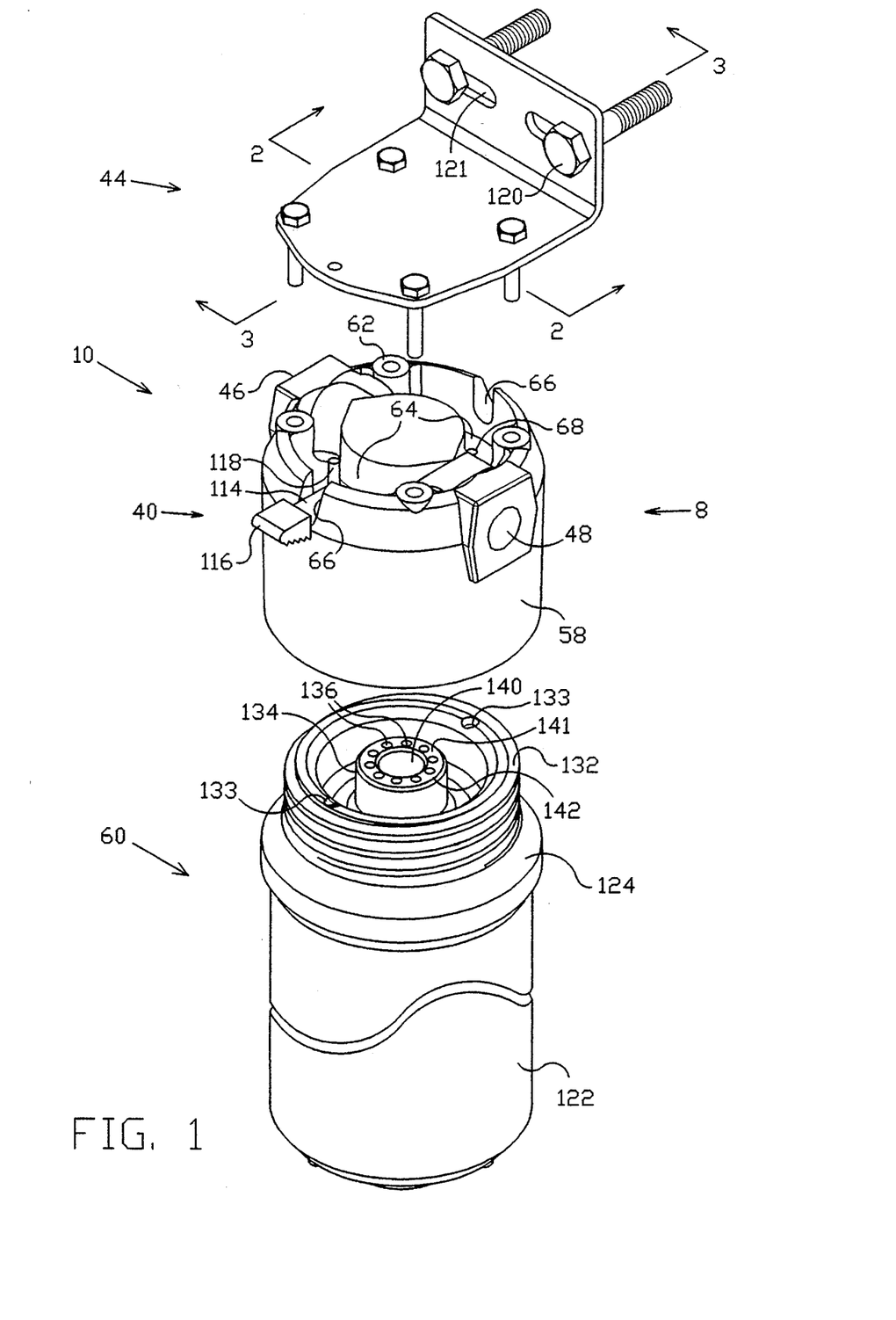
FIG. 1 is an isometric view of one embodiment of the invention, with bracket, valve head assembly, and filter cartridge separated for clearer viewing.
Figure 2:
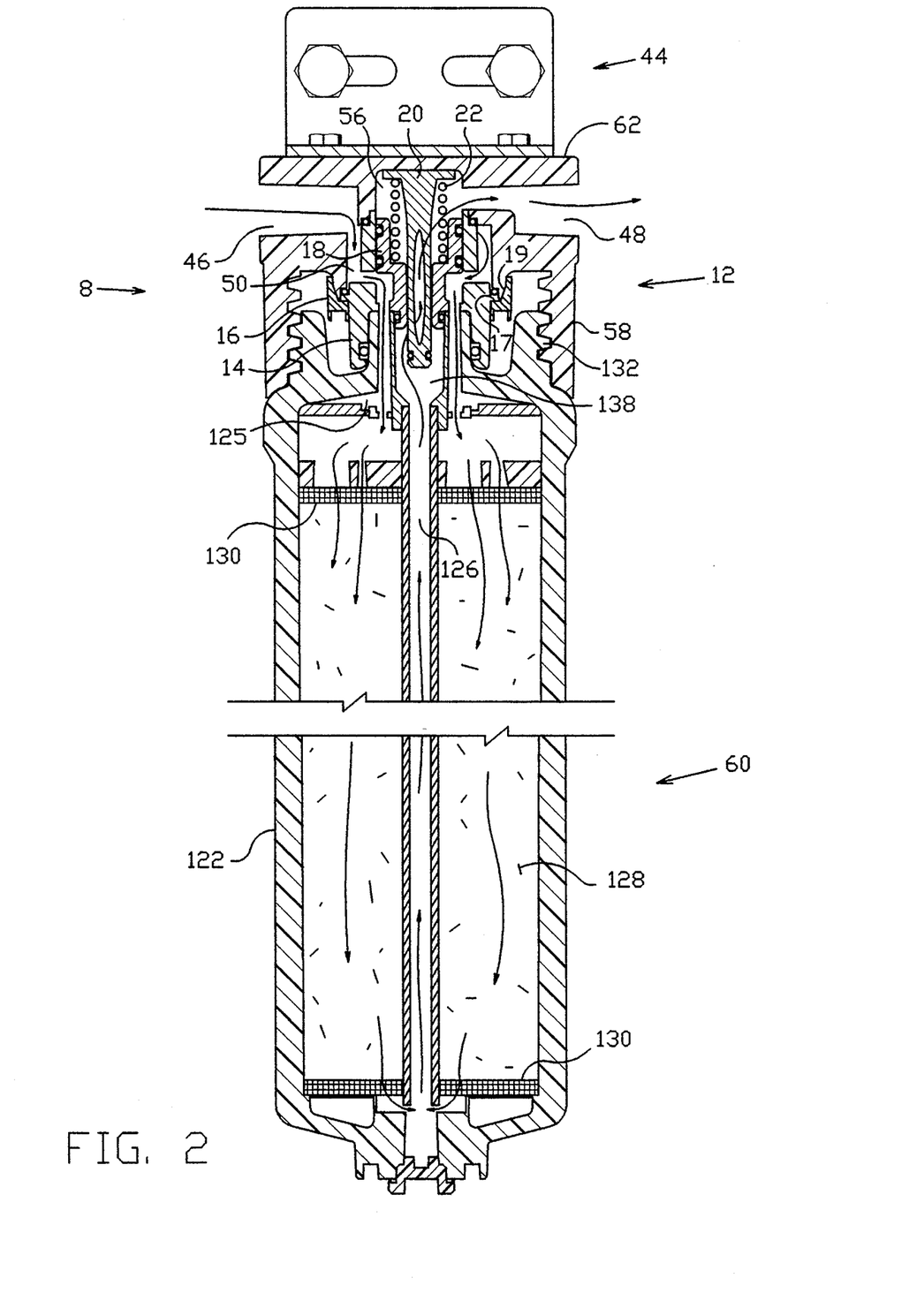
FIG. 2 is a cross-sectional view of the embodiment of FIG. 1, viewed along line 2—2 in FIG. 1, with the filter cartridge installed and the piston in the "on" position.

The outer valve head 12 is generally cylindrical in shape, with its outer surface being the outer surface of the valve head assembly. The outer valve head 12 includes an inlet port 46 and an outlet port 48 near its upper end. The inlet and outlet ports 46 and 48 are preferably 180° juxtaposed on the same horizontal plane with the same centerline. These ports 46 and 48 are threaded to receive appropriately-sized pipe fittings (not shown) for connection to a pipe or other fluid conduit. The inlet port 46 opens at its lower inside rim into the outer cavity 50. The outer cavity 50 is located at the upper central portion of the outer valve head 12 and is of a cylindrical shape that runs along the vertical centerline of the outer valve head 12. The lower outside rim 52 of the outer cavity 50 forms a step for engaging a seal 31. Another such step is found on the upper inside rim 54 of the outer cavity 50 and is used for engaging a seal 32. The outer cavity 50 steps down to an even smaller diameter cylindrical upper cavity 56 above the outer cavity 50. The outlet port 48 intersects the upper cavity 56 towards the top end of the cavity 56. The outlet port 48 steps up to a larger diameter near the outside of the outer valve head 12, so that the narrow portion of the outlet port 48 near the upper cavity 56 avoids intersecting the outer cavity 50. The lower outside portion 58 of the outer valve head 12 provides a securing means for securing and supporting the filter cartridge 60. FIG. 2 shows the lower outside portion 58 being threaded to cooperate with a threaded filter cartridge 60, but, alternatively, a bayonet cam mechanism or other securing means may be used.

The top surface 62 of the outer valve head 12 may include four bolt holes or other means to secure the outer valve head 12 to the bracket 44, which is for mounting the filter assembly onto a wall or grating. To maintain a constant wall thickness, two cavities 64 on the top surface 62 of the outer valve head 12 are formed. Two lever slots 66 are 180° juxtaposed to one another and 90° from the inlet and outlet ports 46 and 48 at the outer, upper rim of the outer valve head 12. These lever slots 66 extend vertically from the top of the outer valve head 12 to the horizontal centerline formed by the inlet and outlet ports 46 and 48. A lever hole 68 is located at the bottom of each of the cavities 64 directly in line with each lever slot 66 and extends through the outer valve head 12 into the space 71 beside the lower outside portion 58 of the outer valve head 12.

The piston sleeve 14 is generally cylindrical in shape and is received and secured into the outer cavity 50 of the outer valve head 12. A step 70 is formed about half way up the piston sleeve 14 and is used to seat a seal 31 against the step in the lower outside rim 52 of the outer valve head 12. Another step 72 is formed at the upper end of the piston sleeve 14 that is used to seat a seal 32 against the upper inside rim 54 of the outer valve head 12. A rim 74 protruding from the outer middle part of the piston sleeve 14 is used in securing and sealing the piston sleeve 14 to the outer valve head 12 by means of a securing ring 16. With the piston sleeve 14 received in the outer valve head 12, the inner surface 75 of the piston sleeve 14 plus the inner surface of the upper cavity 56 forms the valve head assembly inner surface and define a generally-vertical and generally-cylindrical bore 78 for receiving the piston 18 and the upper end or neck 134 of the filter cartridge 60. The piston sleeve inner surface 75 and the side surface of the upper cavity 56 are generally vertical and form the upper side surface of the bore 78. The upper portion 109 of the upper cavity 56 inner surface is horizontal and forms the top surface of the bore 78.

Several openings 76 extend through the piston sleeve wall just above the middle step 70. These openings 76 extend radially inwardly to the cylindrical bore 78 of the piston sleeve 14. A seal groove 80 is found at the lower end of this bore 78 on the inner surface 75 for receiving seal 33. Just slightly below the mid point of the inner surface 75 is an inwardly protruding rim 82.

A ring or securing ring 16 joins the outer valve head 12 and piston sleeve 14 together. This securing ring 16 has several drive holes 21 located on its bottom rim. A tooling fixture may be inserted into these drive holes 21 to drive and spin weld the securing ring 16. The upper central section of the securing ring 16 forms a rim 17 and a slanted surface 19 extends upward from the rim to form an upwardly-protruding cylinder. The slanted surface 19 engages the lower outside rim 52 of the outer valve head 12 and the rim 74 of the piston sleeve 14 and the upwardly protruding cylinder acts as a flash trap during the spin welding process that forms a unified bond between them.

The preferred closure member is a piston 18, which is an open-ended, hollow, generally cylindrical shape. The piston 18 is received coaxially in the cylindrical bore 78 and held from falling out of the piston sleeve 14 by the inwardly protruding rim 82. A lower piston seal groove 90 is located in the piston lower portion 92 on the exterior surface 93 of the piston 18, for receiving seal 36. About half way up, the diameter of the piston 18 increases to form a piston upper portion 94. Two seal grooves 96 are located near the bottom and top of the vertical exterior surface 93 of this upper portion 94, for receiving seals 34, 35. The generally cylindrical piston interior surface 95 defines an interior space, which includes a piston upper interior space 102 and a piston lower interior space 104. The interior space holds the valve stem 20 ", with the stem 20 being generally coaxial with the interior space ". The piston upper interior space 102 has a larger diameter than the piston lower interior space 104, which results in a ledge 97 at the intersection between the two. The piston upper interior space 102 and the ledge 97 hold and support the piston return spring 22.

The valve stem 20 is generally cylindrical in shape, with a slight curve about three-fourths of the way up the stem 20 to strengthen it. The stem 20 has a top cylindrical plate 110 that abuts and is forced against the upper portion 109 of the upper cavity 56 by the return spring 22. The stem 20 has an elongated body that extends down through both the upper interior space 102 and the lower interior space 109. The stem central body 103 has an elongated exit hole 108 running from above the bottom end 105 of the stem to about three-fourths of the way up the stem 20 so that the upper end 107 of the hole 108 is in fluid communication with the upper cavity 56 and hence with the outlet port 48. Thus, the elongated hole 108 provides a space between the piston 18 and the stem central body 103, for transmitting fluid from the filter outlet opening 140 up through the piston interior space to enter the upper cavity 56 and then the outlet port 48°

Figure 3:
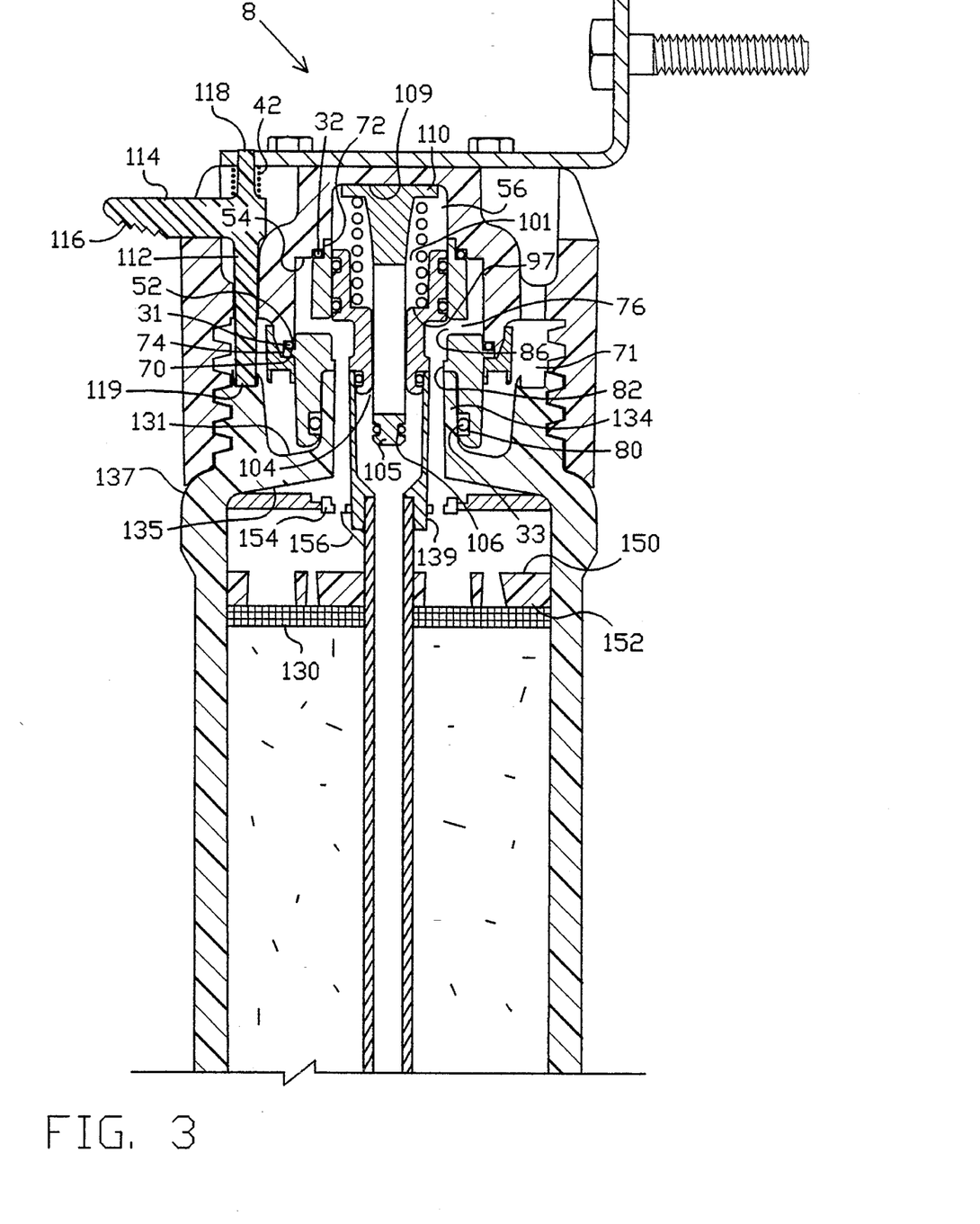
FIG. 3 is a cross-sectional view of the embodiment of FIG. 1, viewed along line 3—3 in FIG. 1, with the filter cartridge installed and the piston in the "on" position. This also shows the engagement of the locking lever arm and the falter cap.
Figure 4:
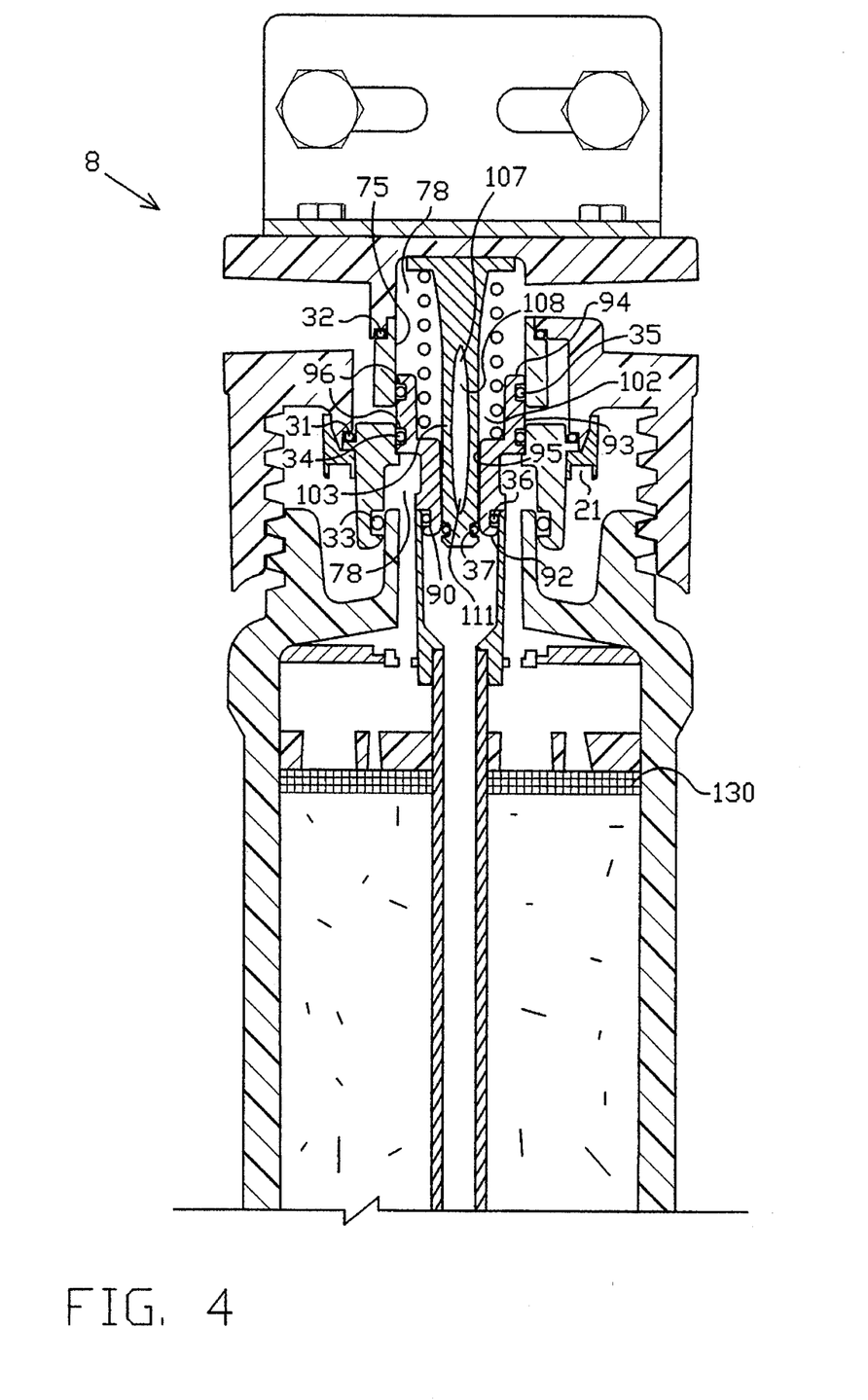
FIG. 4 is a cross-sectional view of the embodiment of FIG. 1, also viewed along line 2—2 in FIG. 1, but with the filter cartridge lowered and the piston in the "off" position.

The elongated exit hole 108 of FIG. 2–4 penetrates through the stem 20 from side to side. Alternatively, the stem 20 could have one or more elongated channel(s) 113 that penetrate into the central body from the side but do not necessarily go all the way through the stem 20, as in the embodiment of FIG. 5. Thus, either the elongated hole 108 or alternative elongated channel(s) 113 in the central body 103 are called herein "indentations" and provide a space for fluid flow between the piston interior surface 95 and the stem 20 surface for fluid flow up through the piston interior space.

The stem 20 also provides an outlet seal 37 for the piston 18 to seat against to block the fluid outlet passage. The bottom end 105 of the stem 20 is approximately the same diameter as the piston lower interior space 104 and has a stem seal groove 106 for receiving seal 37. When valve and filter assembly 8 is in the "off" position, the piston interior surface 95 slides down to seal against seal 37, thus, blocking the space between the piston 18 and the stem 20. Alternatively, other shapes of stems besides the stem 20 may be used, as long as the stem member is received in the piston interior space so that fluid may flow up through the hollow piston and the stem member has a bottom end with a seal for cooperation with the piston interior surface 95.

The piston 18, stem 20, and spring 22 are supported inside the cylindrical bore 78 and touch each other, but they are not attached to each other or to the piston sleeve 14 or outer valve head 12. This configuration results in the option of replacing the piston sleeve 14, piston 18, stem 20, and spring 22 by a "passive inner valve head". The passive inner valve head (not shown) forms inlet and outlet passages without the action of a valve and, therefore, without the auto shut-off feature when the filter cartridge 60 is removed. A valve head assembly with this passive inner head may be useful for applications not needing the auto-shut-off feature in every filter, for example, as part of a bank of filter assemblies where only one shut-off system is needed.

The lever arm 40 includes a generally cylindrical vertical member 112 and a generally cylindrical horizontal arm 114 connected to and intersecting the vertical member 112 at 90° just below the upper end of the vertical member. At the outermost end of the horizontal arm 114 is a finger pad 116, which is slightly wider than the vertical member 112 and has grooves on its bottom side for use as a finger grip. The upper end 118 of the vertical member 112 is a slightly smaller diameter than the lower end. The lever arm return spring 42 is a standard stainless steel spring.

The mounting bracket 44 has an "L" shaped cross section. Four holes coincide with the holes in the top surface 62 of the outer valve head 12. Four screws are used to attach the mounting bracket 44 to the outer valve head 12. Additional holes or slots 121 and screws, nuts and bolts 120 may be used to mount the bracket to the wall or to the vending machine. An additional hole is located at the front and center of the bracket 44 for receiving the vertical member 112 of the upper end of the lever arm 40.

Quick-Connect Filter

The filter cartridge 60 comprises a body 122, a cap 124, a central return tube 126, filtering media 128, separator disks 130, and spring disc 150.

The body 122 is generally cylindrical in shape with an interior space and a large top opening. The lower end of the body 122 is covered and may or may not have a small inlet or outlet depending on the filtering process. The body 122 has a rim around its top opening for spin welding, or attachment by other means, of the cap 124 to seal the cap 124 to the body 122.

Figure 6:
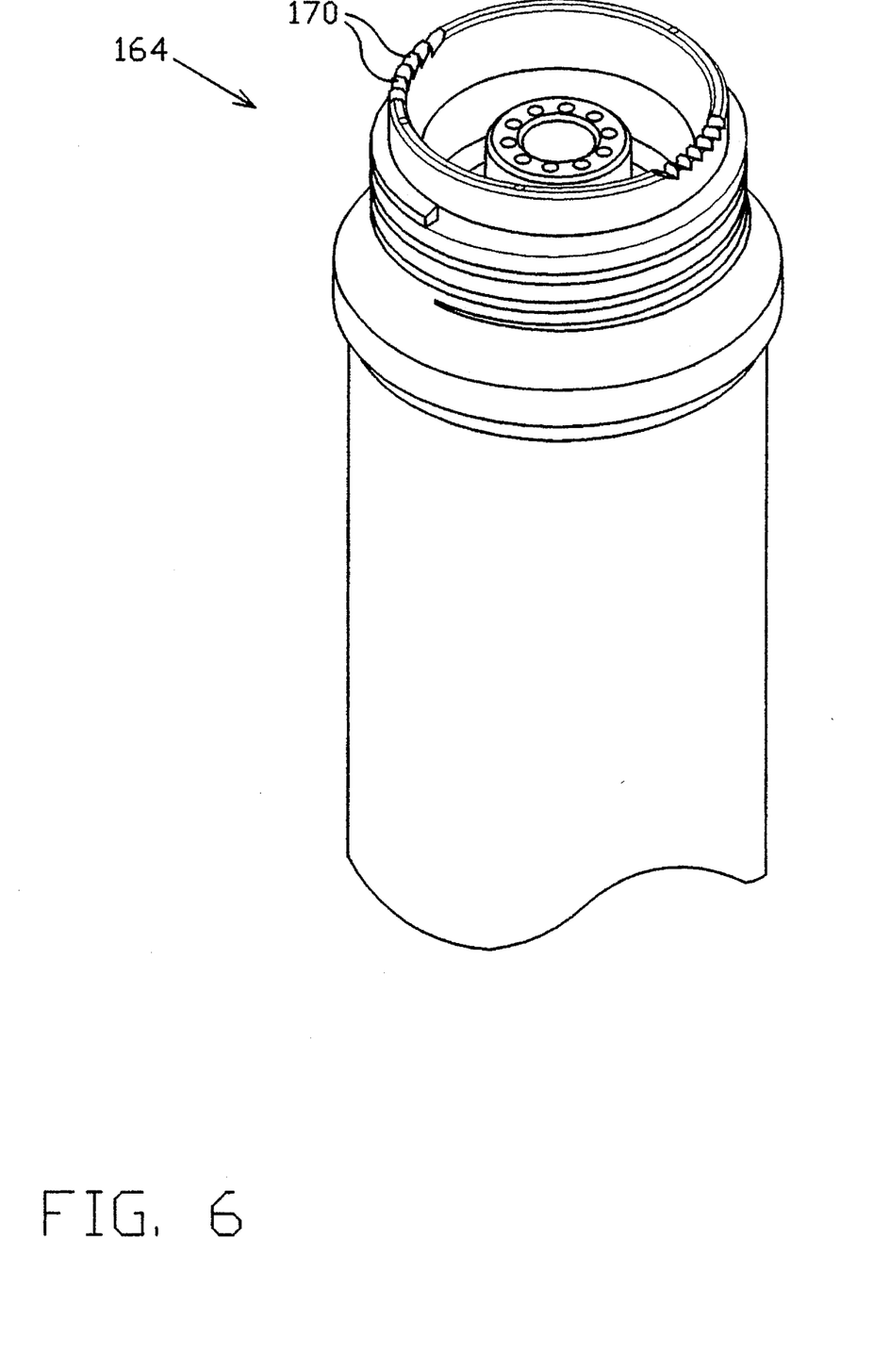
FIG. 6 is an isometric view of the filter cartridge of the embodiment of FIG. 5.

The cap 124 is a disk shape for covering the top opening of the body 122, and has a cap top surface 131, a cap bottom surface 135, and an outer edge 137. The outer rim 132 of the cap extends from the cap top surface 131 and provides a means for securing the filter cartridge 60 to the valve head assembly 10. In the filter cartridge 60 of FIG. 1–4, two holes 133 in the top of the rim 132 line up with the lever holes 68 in the outer valve head 12 for receiving the lower end of the lever arm vertical member 112, for acting as a lock means to lock the cartridge 60 into the valve head assembly 10. Alternatively, as illustrated by FIG. 6, angled cap slots 170 other depressions may be made in the rim for receiving the vertical member 112.

The lever arm return spring 42 surrounds the upper end 118 of the vertical member 112. It is sandwiched between the mounting bracket 44 and the cylindrical horizontal arm 114. This spring provides a downward force which pushes the lower end 119 of the cylindrical vertical member 112 into a hole 133 or angled cap slots 170 in the top of the filter cap rim 132. The lower end 119 may be flat to drop into a hole 133 or it may be terminated at an angle to permit the repeated rise and fall of the lever arm as it moves across the angled cap slots 170. Both of these alternatives prevent an accidental counter-rotation of the filter cartridge without first lifting the finger pad 116 to disengage the hole 133 or angle cap slots 170.

A cylindrical neck 134 protrudes upward from generally the center of the cap 124. A plurality of filter inlet holes 136 extend vertically through the neck 134, downward from the neck top surface 141 to the cap bottom surface 135 to provide the fluid inlet opening into the filtering media 128. The inlet holes 136 are located generally around the circumference or perimeter edge 142 of the neck 134 and around a central return hole 138. The central return hole 138 also extends vertically down through the neck 134 from the top to the bottom of the cap, and thus, is the filter outlet opening 140. On the bottom of the cap 124 are a plurality of ribs 125 for additional strength. A cylindrical protrusion 139 extends downward from the bottom of the cap 124 around the central return hole 138. The inside surface of this protrusion 139 angles inward slightly and then angles back out to match the diameter of the central return hole 138 near the top of the neck 134.

The central return tube 126 collects the filtered fluid at the base of the filter body 122 and delivers it to the central return hole 138. Separation disks 130 near the top and near the bottom of the filter cartridge 60 retain the filter media 128 during fluid flow and prevent sediment from passing through the filter. Additional separation disks may be required for additional media.

Preferably, the filter cartridge 60 includes a spring disk 150 comprising a bottom perforated plate 152 for resting and pushing down on the media 128 or on a separation disk 130, a top ring 154 for abutting against the ribs 125 of the bottom of the cap 124, and one or more helically-shaped spring members 156 for resiliently connecting the bottom plate 152 to the top ring 154. Thus, the spring member 156 pushes down the bottom plate 152 and creates a downward force on the media 128. This downward force keeps the media 128 compressed during transport, handling and use, for maintaining good flow distribution through the media.

In the description and claims, the term "filter cartridge" refers to any filtering unit, which may be a completely disposable unit, a refillable unit for emptying and refilling with fresh filtering media, or a reusable casing into which a disposable filter may be inserted.

Filter cartridges may be used that have various flowschemes and various media contained in the cartridge interior space. For example, the embodiment shown in the Figures includes a replaceable filter cartridge containing a finely ground granular filtering media in an annular space between the cartridge wall and a central return tube, having an axial flow direction downward through the media, with the central return tube having a fluid inlet at its bottom. Another embodiment could include a replaceable filter cartridge containing a radial flow direction porous block filtering media and having a central return tube with fluid inlets along its sides. Another embodiment could include a radial flow direction filter containing several layers of porous material filtering media and having a central return tube with fluid inlets along its sides. Another embodiment could include a filter containing a reverse osmosis membrane and having a central return tube for the filtered fluid and an outlet at the bottom of the filter for the brine water.

Operation of the Filtering and Shut-off System

The "on" position is initiated by the insertion or screwing of the filter cartridge 60 into the valve head assembly 10, so that the neck 134 abuts on the piston lower portion 92 and forces up the piston 18. The outer surface of the neck 134 forms a seal with the piston sleeve 14 inner surface 75, by contact with the seal 33. The surface of the neck central return hole 138 forms a seal with the lower seal 36 on the piston lower portion 92. As the filter cartridge 60 progresses into the valve head assembly 10, it forces the piston 18 upward and exposes the openings 76. At the same time, the upward movement of the piston 18 breaks the seal between the bottom end 105 of the valve stem 20 and the piston 18 to expose the lower end 111 of the hole 108.

Figure 5:
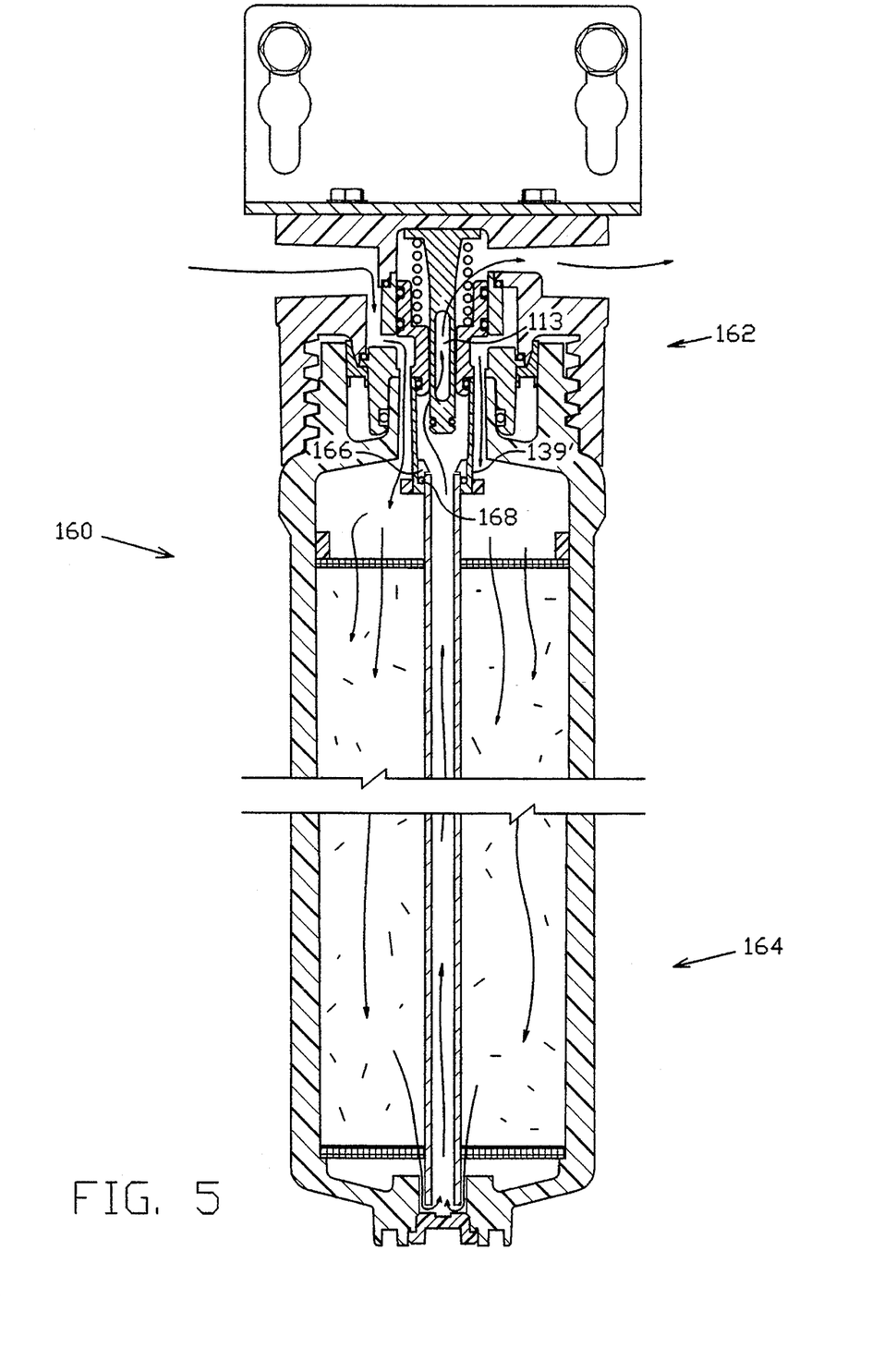
FIG. 5 is a cross-sectional view of another embodiment of the invention.

Therefore, in the "on" position, as shown in FIG. 2 and 5, the fluid may flow from the inlet port 46, into the outer cavity 50, through the openings 76, into the cylindrical bore 78, and into the filter cartridge 60 through the inlet holes 136 in the neck 134. After passing through the filter media 128, the fluid flows through the central return tube 126 into the return hole 138. From the return hole 138, the fluid flows up through the elongated hole 108 of the stem 20, into the upper cavity 56, and out of the valve head assembly 10 through the outlet port 48.

When the filter cartridge 60 is lowered, either by being partly unscrewed to a lower position or by being completely removed from the valve head assembly 10, the valve head assembly 10 moves into the "off" position, as shown in FIG. 4. The piston return spring 22 pushes the piston 18 downward, resulting in the two seals 34, 35 and the vertical exterior surface 93 of the upper portion 94 of the piston covering or flanking the radial openings 76 to stop flow of fluid from the outer cavity 50 into the cylindrical bore 78. At the same time, a seal is formed between the piston lower portion 92 and the bottom end 105 of the stem 20 below the hole 108. The seal 37 in stem seal groove 106 contacts the piston interior surface 95 of the piston 18 to prevent any fluid from leaking from the upper cavity 56 or outlet port 48 and flowing out of the piston interior space 101 and down past the stem bottom end 105. Consequently, the filter cartridge 60 may be completely removed from the valve head assembly 10 without leaks or back-flow, from inlet port 46 and outlet port 48, and without having to manually shut off any valves in the fluid conduits. During filter removal, a small amount of fluid, from the cylindrical bore 78 may fall onto the top of the cap 124. The space between the rim 132 and the neck 134 acts like a cup to capture any residual liquid from the disconnection of the filter cartridge 60 from the valve head assembly 10.

When the filter cartridge 60 is fully screwed into the valve head assembly 10, the lever arm 40 is pushed down, so that the vertical member 112 slides down through the lever hole 68 and the lower end of the vertical member 112 enters one of the holes 133 in the top of the cap rim 132. Thus, the filter cartridge 60 is locked from unintentional unscrewing or loosening by vibration.

To disengage the filter cartridge 60, the user lifts up on the lever arm 40 to pull the lower end of the vertical member 112 out of the hole 133 or angled slots 170. This then allows the filter cartridge 60 to be rotated counter-clockwise for removal from the valve head assembly 10.

! n the filter assembly 8, the term "fluid inlet passage" in the valve head assembly 10 may include all or part of the inlet fluid path extending from the valve head outer surface to the filter inlet holes 136, that is, the inlet fluid path that includes the inlet port 46, the outer cavity 50, the openings 76, and part of the piston sleeve cylindrical bore 78. In filter assembly 8, the term "fluid outlet passage" may include all or part of the outlet fluid path extending from the filter central return hole 138 to the valve head outer surface, that is, the outlet fluid path that includes the piston lower interior space 104, exit hole 108, and piston upper interior space 102 (in other words, the space between the stem and the interior surface of the piston), plus the upper cavity 56 and the outlet port 48.

In the description and in the claims, references to "inlet" and "outlet" and related directions of fluid flow are made for clear description, but are not meant to limit the invention to specific embodiments or to uses where the fluid flows in a particular direction. For example, the invention includes embodiments where fluid is made to flow into the port described herein as the "outlet port" and out of the port described herein as the "inlet port."

The valve head assembly 10 and filter cartridge 60 may be made of various materials, for example, food-grade plastics or metals suited to a particular application. The preferred material for valve head and filter cartridge is plastic. The piston return spring 22 is preferably a standard stainless steel spring. The seals 31–37 may be o-rings or other sealing means, which are not limited to separate, removable sealing members, but include, for example, metal to metal contact or inserts of other sealing materials. Therefore, in the description and claims, references to a surface or a sealing means blocking, closing or sealing a passage, hole, channel, etc., means that the surface or sealing means may do so by various means, including contact by the surface or sealing means or contact by seals or inserts associated with the surface or sealing means.

An especially-preferred embodiment of the invention is shown in FIGS. 5 and 6. This filter assembly 160 comprises valve head assembly 162 and filter cartridge 164. The design and operation of filter assembly 160 is substantially the same as filter assembly 8, except for the seal retainer ring 166, eighth seal 168, angled cap slots 170, and the elimination of the outwardly-extending inlet groove 86 of the piston sleeve.

Seal retainer ring 166 is a generally cylindrical ring which rests in the portion of the central return hole 138 defined by the modified cylindrical protrusion 139'. The seal retainer ring 166 holds in place the o-ring 168, which creates a seal between the central return tube 126 and the cylindrical protrusion 139'.

The angled cap slots 170 of this especially-preferred embodiment are depressions in the rim top surface, which are for receiving the lower end of the lever arm vertical member 112 to serve as a lock means when the filter cartridge 164 is fully installed. The lower end of the vertical member 112 may be angled for sliding easily into the angled slots 170. There are preferably a plurality of cap slots 170, giving leeway in the position that the filter cartridge 164 must be in for the vertical member 112 to slide into a cap slot 170.

Although this invention has been described above with reference to particular means, materials and embodiments, it is to be understood that the invention is not limited to these disclosed particulars, but extends instead to all equivalents within the scope of the following claims.

What is claimed is:

1. A valve head for connection to a provided filter cartridge having an upper end, the valve head comprising:

a valve head outer surface;

a valve head inner surface defining a generally-cylindrical bore opening downward for receiving the filter cartridge upper end, the valve head inner surface having a bore too surface;

a fluid inlet passage extending from the valve head outer surface to the valve head inner surface;

a generally-cylindrical hollow closure member received in and generally coaxial with the said bore, the closure member having an exterior surface and an interior surface defining an interior space;

a stem member received in and generally coaxial with the interior space of the closure member but not attached to the closure member or to the valve head, the stem member having a top end, central body, and bottom end, the too end abutting the said bore top surface;

wherein the closure member is movable upward relative to the stem member to a first position and is movable downward relative to the stem member to a second position;

wherein the stem member central body is shaped to allow fluid flow through the closure interior space, when the closure member is in the first position;

means for forming a seal between the closure member exterior surface and the valve head inner surface when the closure member is in the second position to block the fluid inlet passage;

means for forming a seal between the closure member interior surface and the stem member when the closure member is in the second position to block fluid flow through the closure member interior space; and a spring contacting and extending between the stem member top end and the closure member, and wherein the spring forces the stem member top end up against the bore top surface and biases the closure member away from the stem member top end into the second position.

2. A valve head as set forth in claim 1, wherein the stem member central body has an elongated indentation for allowing fluid flow through the closure interior space when the closure member is in the first position.

3. A valve head as set forth in claim 2, wherein the indentation comprises an elongated hole passing side to side through the central body of the stem member.

4. A valve head as set forth in claim 2, wherein the indentation comprises an elongated channel penetrating into the central body of the stem member.

* * * * *